(No Model.)

J. M. MOFFAT.
CELL OR BOX FOR ELECTRIC BATTERIES.

No. 572,438. Patented Dec. 1, 1896.

Witnesses.
Thos. A. Bunn
Robert Everett

Inventor,
John Miles Moffat.
By James L. Norris
Atty.

UNITED STATES PATENT OFFICE.

JOHN MILES MOFFAT, OF LONDON, ENGLAND.

CELL OR BOX FOR ELECTRIC BATTERIES.

SPECIFICATION forming part of Letters Patent No. 572,438, dated December 1, 1896.

Application filed May 23, 1896. Serial No. 592,792. (No model.) Patented in England May 30, 1894, No. 10,463, and in Germany March 26, 1895, No. 85,828.

*To all whom it may concern:*

Be it known that I, JOHN MILES MOFFAT, electrical engineer, a subject of the Queen of Great Britain, residing at London, England, have invented certain new and useful Improvements in the Cells or Boxes of Electric Batteries, (for which I have obtained patents in the following countries: Great Britain, No. 10,463, dated May 30, 1894, and Germany, No. 85,828, dated March 26, 1895,) of which the following is a specification, reference being had to the accompanying drawings, in which—

Figure 1:
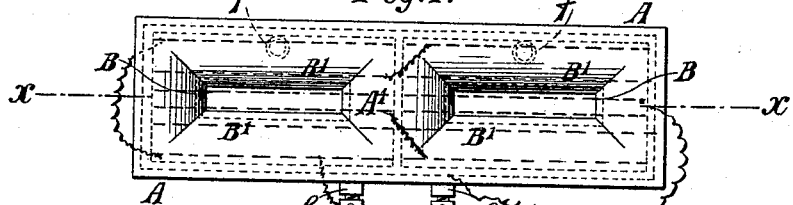
Figure 2:
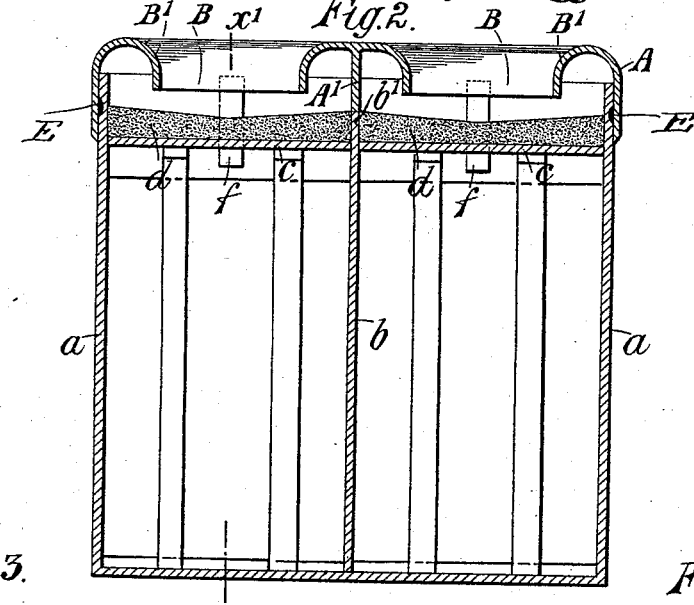
Figure 3:
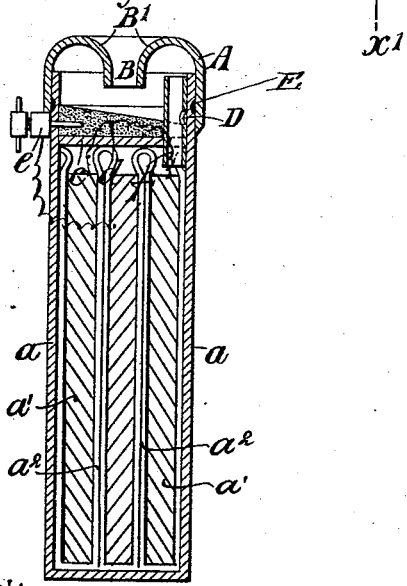
Figure 4:
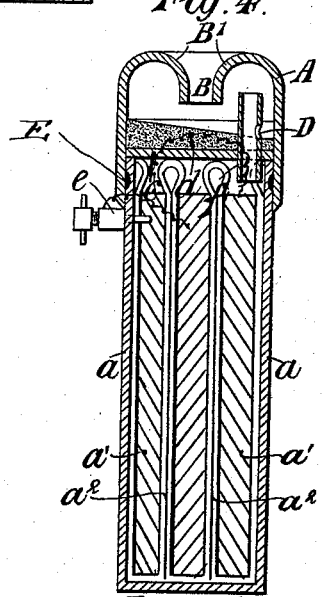

Figure 1 is a plan; Fig. 2, a longitudinal section on the line $x\,x$, Fig. 1; and Fig. 3, a transverse section on the line $x'\,x'$, Fig. 2, showing the application of my improvements to a battery-box having two compartments or cells. Fig. 4 is a similar view to Fig. 3, showing another form or modification of my invention.

My invention relates to the cells or boxes of electric batteries and is designed to provide for preventing the escape of the acid or other electrolyte employed therein. In such cells, as heretofore constructed, there is nothing to prevent the rising and escape of the electrolyte during the process of charging the battery should a rapid evolution of gas take place. The outer sides of the cells and the terminals are therefore liable to become moistened with acid, thus causing corrosion and leakage.

Now according to my said invention I make the walls or sides of the cell extend higher than the sealing-lid which covers the plates or electrodes, and I curl or turn inward the top edge of the said walls or sides all around the cell, so as to form a hollow lip above the said sealing-lid. Moreover, I make the said lid with its upper surface sloping downward toward the vent-tube, and I arrange the said vent-tube beneath the inwardly-turned lip, so that any liquid that may be carried in suspension by the gas through such vent-tube will be arrested by the said lip, and, flowing down the sloping lid, will return to the interior of the cell through a lateral opening in the said vent-tube.

In the accompanying drawings, $a$ is the battery-box, which, in the example shown, is provided with a partition $b$, dividing it into two compartments or cells.

$c\,c$ are the sealing-lids, which serve to inclose the electrodes $a'$, the separating devices or plates $a^2$ between the electrodes, and other parts of the battery. These lids are preferably held in position by a layer of suitable insulating and acid-proof cement $d$, which also serves to protect the connections to the terminals $e$.

$f\,f$ are tubes forming vent-holes to the interior of the cell.

The above-mentioned arrangement for sealing or closing a battery box or cell is well known, and I therefore make no claim thereto, except in so far as it forms one of the parts of my improved battery box or cell.

The walls $a$ in the box shown are extended upwardly by means of a cap or cover A, which is here shown as made in a separate piece from the box $a$. This cap or cover is made with apertures B in its surface corresponding to the compartments or cells of the battery-box. Around these apertures are inwardly turned or curled lips B'. These lips extend over the vent-tubes $f$, the upper ends of the said tubes thus lying in the space between the outer wall of the cap or cover A and the internally-projecting lip B', so that any spray caused by the bursting of bubble-films or otherwise will be caught by the said cover and prevented from spraying or running over the sides of the cell and so corroding the terminals and damaging surrounding objects. To insure the return of the liquid thus arrested to the interior of the cells, I mold or shape the upper surface of the layer of cement $d$, or, if that be not present, the upper surface of the covering $c$, in such a manner as to cause the said liquid to flow toward apertures D in the vent-tubes $f$ and run back through the said apertures into the interior of the cells.

In the arrangement shown the cap or cover A is made with an internal partition A', corresponding to the end $b'$ of the partition $b$ in the box, the said partitions being united, when the said cap or cover is fitted on the box $a$, preferably by means of the layer of cement $d$. In this manner the spaces within the cap or cover A above the coverings $c$ are separated and insulated from each other, and any electrical leakage between the two compartments or cells is thus prevented. The spaces within the cap or cover A above the coverings c on each side of the openings B are preferably of such capacity that they will hold all the liquid that will flow into them through the vents f when the battery-box is laid on either of its sides, so that no loss of liquid can take place.

The joint between the cap or cover A and the box a may be made tight in any convenient manner.

By my invention I obviate the necessity for the india-rubber bags heretofore employed for containing pocket-accumulators and other electric batteries and the attendant film of acid which tends to corrode the terminals and to cause leakage and waste of the electric energy stored in the cell, as any liquid which is forced out of the cells by the evolution of gas therefrom or otherwise is automatically returned, and the battery may be carried in the pocket or placed in other positions without any risk of damage to its surroundings by spilling of the acid or other liquid and without liability to deterioration of the plates or electrodes by reason of their being left uncovered with liquid.

The cap or cover A may be made of ebonite, celluloid, or other suitable material and may be ornamented or varied in form according to requirements. It is obvious that I can make the said cap or cover so that it can be very readily taken off and put on again and that I can arrange the sealing-lid c within the said cap or cover, as shown in Fig. 4, so as to permit access to the interior of the cell when the said cap or cover is taken off.

The letter E indicates a groove formed around the surface of the box a to receive a band or fillet of cement, and so facilitate the production of a good joint between the cap or cover A and the said box a.

It is evident that my invention is applicable to various kinds of electric batteries having either one or more cells and that its construction may be somewhat modified, if desired.

What I claim is—

1. A battery cell or box provided with an inwardly turned or curled lip at its upper end, a sealing-lid beneath said lip, and a vent arranged in said sealing-lid and opening beneath said lip, thereby preventing the escape of liquid while permitting the escape of gas from said cell or box.

2. In a battery cell or box, the combination, with the sealing-lid, of a vent-tube therein having a lateral opening above said lid, and a wall extending upward from said sealing-lid and having at its upper end an inwardly turned or curled lip which extends over said vent-tube so as to prevent the escape of liquid from said cell or box while permitting the escape of the gases therefrom.

3. A battery cell or box comprising a sloping sealing-lid, a wall extending upward from said lid and having at its upper end an inwardly turned or curled lip, and a vent-tube beneath said inwardly turned or curled lip extending through the lower part of said lid and having a lateral opening immediately above the same, substantially as and for the purposes hereinbefore described.

4. A battery cell or box the cap or cover of which is made with an inclined sealing-lid and with an inwardly turned or curled lip above said lid, and with a vent-tube beneath said inwardly turned or curled lip extending through the lower part of the inclined lid and having a lateral opening above the same, substantially as and for the purposes hereinbefore described.

In testimony whereof I have hereunto set my hand in presence of two subscribing witnesses.

JOHN MILES MOFFAT.

Witnesses:
  JOHN T. KNOWLES,
  HENRY W. LYNDEN.